United States Patent [19]

Inagaki et al.

[11] Patent Number: 6,100,345
[45] Date of Patent: Aug. 8, 2000

[54] THERMALLY RESISTANT RESIN COMPOSITION AND METHOD FOR MISCIBLE PREPARATION

[75] Inventors: Yasuhito Inagaki; Tsutomu Noguchi, both of Kanagawa; Hidemi Tomita, Tokyo, all of Japan

[73] Assignee: Sony Corporation, Tokyo, Japan

[21] Appl. No.: 09/182,256

[22] Filed: Oct. 29, 1998

Related U.S. Application Data

[62] Division of application No. 08/699,936, Aug. 20, 1996, Pat. No. 5,847,049.

[30] Foreign Application Priority Data

Aug. 21, 1995 [JP] Japan ............................. P07-234791
May 11, 1996 [JP] Japan ............................. P-08-140673

[51] Int. Cl.$^7$ .................................................. C08F 283/08
[52] U.S. Cl. ..................... 525/397; 525/390; 525/391; 525/68; 525/66; 525/69; 525/71; 525/78
[58] Field of Search ................................. 525/68, 71, 66, 525/69, 397, 78, 390, 80, 391, 333.3; 524/399, 408

[56] References Cited

U.S. PATENT DOCUMENTS 4,840,982  6/1989  Campbell et al. .................... 524/151
5,331,060  7/1994  Aycock et al. ....................... 525/397
5,352,727  10/1994 Okada .

*Primary Examiner*—Mark L. Warzel
*Attorney, Agent, or Firm*—Hill & Simpson

[57] ABSTRACT

The present invention provides a thermally resistant resin composition containing PS and PPO, wherein at least one of PS and PPO has an acid group and the acid group is neutralized with a basic metal compound containing a metal element of the group 2B, 3B, 4B or 5B of the periodic table; thermally resistant PS and PPO each with an acid group which is also neutralized in the same manner as described above; and a method for miscible preparation of PS and PPO, wherein at least one of PS and PPO has an acid group and the acid group is neutralized similarly.

4 Claims, 1 Drawing Sheet

THERMALLY RESISTANT RESIN COMPOSITION AND METHOD FOR MISCIBLE PREPARATION

This appln is a Divisional of Ser. No. 08/699,936 filed Aug. 20, 1996, now U.S. Pat. No. 5,847,049.

BACKGROUND OF THE INVENTION

1. Field of the Invention

The present invention relates to a thermally resistant resin composition containing polystyrenes (PS) and polyphenylene oxides (PPO).

2. Prior Art

Resin compositions produced by blending PS with a glass transition point (Tg) of about 100° C. and PPO with Tg of about 210° C. together, have been known widely as one class of thermally resistant polymer alloys in a uniformly miscible system. The PS/PPO resin compositions have single Tg approximately corresponding to the arithmetic mean of the Tgs of the two polymers.

Because PS/PPO resin compositions shows excellent electric performance such as dimensional stability, mechanical properties, insulating properties and high-frequency performance, furthermore, the compositions are utilized in resin molded articles such as housings of electric appliances and electronic devices including television sets, air conditioning systems, computer systems; chassis for office appliances for example copying machine and facsimile; various containers (trays and the like); and automobile parts such as instrument panel.

Such PS/PPO resin compositions do not generate hazardous substances such as corrosive gases and dioxin during combustion because the compositions do not contain halogen atoms. In that sense, the compositions are fairly safe. Additionally because PS/PPO resin compositions have excellent thermoplasticity, the compositions can be melt again after the molding process to be put to re-molding process. Thus, PS/PPO resin compositions are considered as recyclable resources. Hence, the utility (applicable range) of PS/PPO resin compositions has been expected to be enlarged from the enhanced need in recent years to preserve the global environment.

The field of the materials for printed board requiring soldering heat resistance (180° C. ) is included in one of their applicable range to be enlarged.

Conventional materials for printed board include for example a composite material such as glass epoxy resin-immersed paper and phenol resin-immersed paper, but it is difficult to separate the individual materials constituting these composite materials. Furthermore, the resins used therein are thermosetting. Therefore, these materials are disadvantageous in that reprocessing (recycling) of these materials via melting is substantially impossible while PS/PPO resin compositions can be recycled. Accordingly, it has been desired to use recyclable PS/PPO resin compositions as printed board materials instead of conventional materials for printed board.

However, the glass transition point of conventional PS/PPO resin compositions corresponds to the arithmetic mean of the Tgs of the two polymers, so that a higher content of PS causes lower Tg compared with the Tg of a resin of 100% PPO. Thus, the heat resistance of PS/PPO resin compositions is poorer than that of the resin of PPO alone.

So as to improve the heat resistance of PS/PPO resin compositions, alternatively, it is proposed to improve the glass transition point of the compositions by introducing a sulfonic acid group into either one or both of PS and PPO and reacting sodium methoxide with the sulfone group to form an ionic bond between the polymer chains (Don-Tsai Hseih et al., Polymer, Vol.33, No. 6, 1210 (1992)).

OBJECTS AND SUMMARY OF THE INVENTION

The heat resistance of PS/PPO resin compositions with an ionic bond introduced by reacting a sulfonic acid group with sodium methoxide is still not sufficient. Therefore, further improvement of the heat resistance is desired.

When an acid group such as sulfonic acid group is introduced into either one of PS and PPO, the miscibility of the two may decrease depending on the type and concentration of the acid group. Hence, it is needed to make the two readily miscible irrespective of the type of the acid group and the like.

In addition to these needs, it is also desired to improve the heat resistance of each of PS and PPO.

The present invention is to overcome the problems of prior art. It is an object of the present invention to further improve the heat resistance of PS/PPO resin compositions. Also, it is an object of the present invention to improve the heat resistance of each of PS and PPO. Still furthermore, it is an object of the present invention to make PS readily miscible with PPO.

So as to improve the heat resistance of a thermally resistant resin composition containing PS and PPO, the present inventors have found that the heat resistance of the thermally resistant resin composition can further be improved by introducing an acid group into PS or PPO or both, and neutralizing the acid group with a basic metal compound containing a metal belonging to the group 2B, 3B, 4B or 5B of the periodic table to form an ionic bond. Thus, the invention has been achieved.

More specifically, the present invention is to provide a thermally resistant resin composition containing PS and PPO, wherein at least one of PS and PPO has an acid group and the acid group is neutralized with a basic metal compound containing a metal element of the group 2B, 3B, 4B or 5B of the periodic table.

Furthermore, the present invention is to provide PS with an acid group, wherein the acid group is neutralized with a basic metal compound containing a metal element of the group 2B, 3B, 4B or 5B of the periodic table. Additionally, the present invention is to provide PPO with an acid group, wherein the acid group is neutralized with a basic metal compound containing a metal element of the group 2B, 3B, 4B or 5B of the periodic table.

Still furthermore, the present invention is to provide a method for miscible preparation of PS and PPO, wherein at least one of PS and PPO has an acid group and the acid group is neutralized with a basic metal compound containing a metal element of the group 2B, 3B, 4B or 5B of the periodic table.

DETAILED DESCRIPTION OF THE PREFERRED EMBODIMENTS

Figure 1:
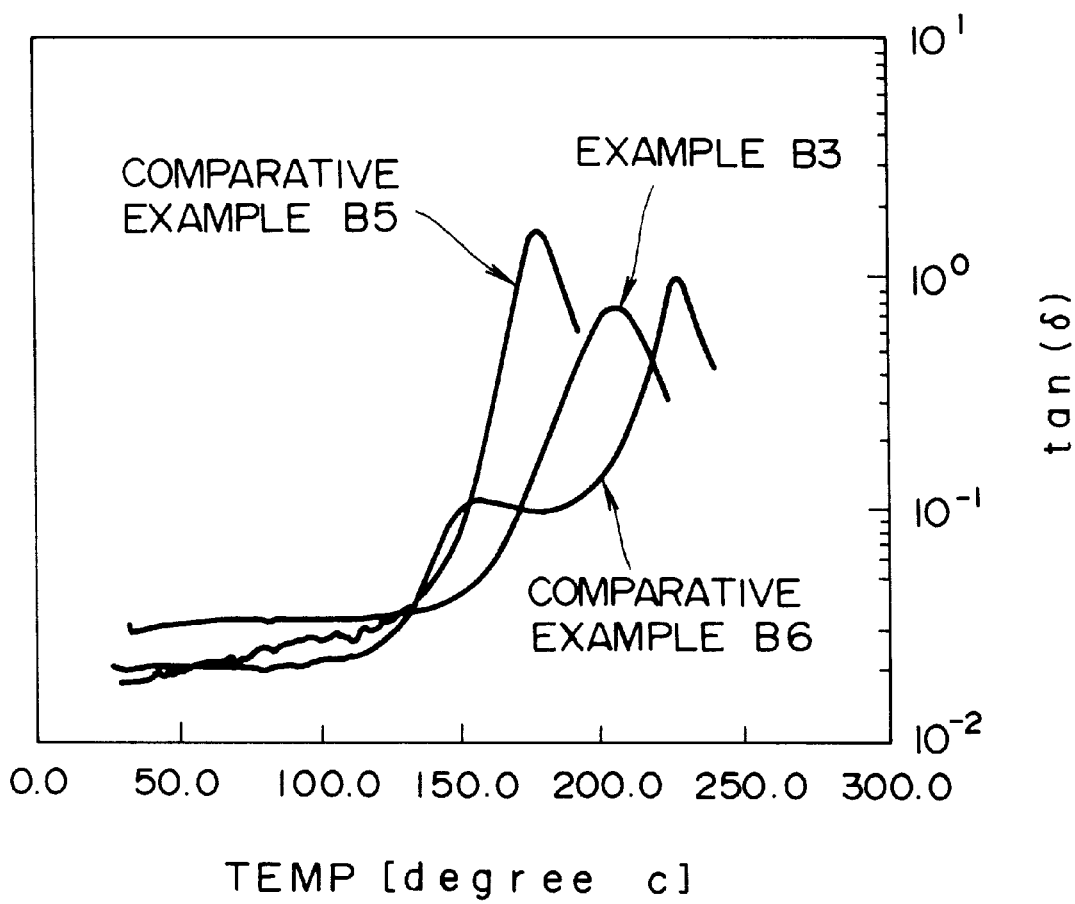
FIG. 1 shows graphs depicting the dynamic elastic moduli (tan δ) of the resin compositions of Example B3, Comparative Examples B5 and B6 vs temperature.

The present invention will be described in detail.

The thermally resistant resin composition containing PS and PPO in accordance with the present invention is produced by reacting a basic metal compound containing a metal element of the group 2B, 3B, 4B or 5B of the periodic table with an acid group derived from at least one of PS and PPO, whereby an ionic bond between the acid and the base is formed. The ionic bond thus formed can bind different types of polymer chains together, so cross-linking structures are formed in the entire polymers constituting the thermally resistant resin composition, whereby the glass transition temperature of the thermally resistant resin composition is improved, involving the improvement of the heat resistance. From the respect of the improvement of heat resistance, preferably, ionic bonds may be formed on the acid groups derived from both of PS and PPO.

The basic metal compound to be used in the ionic bonding includes for example water-soluble salts, hydroxides, halides, and organic acid salts such as acetate and lactate, of zinc (Zn) of the group 2B; aluminum (Al), gallium (Ga), indium (In) or thallium (Tl) of the group 3B; germanium (Ge), tin (Sn) or lead (Pb) of the group 4B; antimony (Sb) or bismuth (Bi) of the group 5B. Specifically, Zn is preferable from the respect of improving the heat resistance, while Al is also preferable from the respect of global environmental concerns after disposal. From the finding that excellent miscibility is exhibited at a mixing ratio in weight of PS and PPO of around 50/50, preference is given to Ge, Sn, Pb, Sb or Bi.

If the amount of such basic metal compound to be used relative to an acid group is too less, the effect of improving the heat resistance is not satisfactory; if the amount is too much, the insulating properties and humidity resistance of the thermally resistant resin composition are deteriorated. Thus, the amount is at a ratio of preferably 1/10 to 10/1 fold in mole, more preferably 1/5 to 5/1 fold in mole.

The acid group derived from at least one of PS and PPO includes for example sulfonic acid group, $OPO(OH)_{21}$ $PO(OH)_{21}$ carboxyl group or phenolic hydroxyl group. Preference is given to sulfonic acid group or carboxyl group in particular.

The PS prior to neutralization, namely the PS prior to the ionic bonding, has a chemical structure specifically represented by the formula (1);

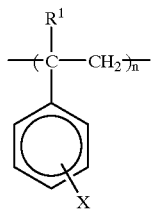
(1)

(wherein $R^1$ is hydrogen atom or methyl group; X is hydrogen atom or an acid group selected from the group consisting of sulfonic acid group, carboxyl group, $PO(OH)_2$, $OPO(OH)_2$ and hydroxyl group; and "n" is a polymerization degree, provided that X is an acid group for the single use of PS). $R^1$ is preferably hydrogen atom in particular; X is preferably sulfonic acid group or carboxyl group from the respect of ready introduction and reactivity with a basic metal compound.

The weight average molecular weight (Mw) of the PS to be used in accordance with the present invention is preferably 50,000 to 400,000, more preferably 190,000 to 350,000 because the heat resistance is insufficient if the weight is too less while the moldability is insufficient if the weight is too much.

The PPO prior to neutralization, namely the PPO prior to the ionic bonding, has a chemical structure specifically represented by the formula (2);

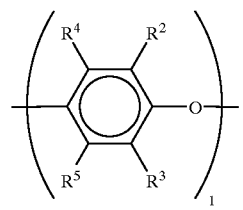
(2)

(wherein $R^2$ and $R^3$ independently represent hydrogen atom, methyl group, or an acid group selected from the group consisting of carboxymethyl group, sulfonic methyl group, $-CH_2PO(OH)_2$, and $-CH_{20}PO(OH)_2$; $R^4$ and $R^5$ independently represent hydrogen atom, methyl group, or an acid group selected from the group consisting of sulfoninc acid group, carboxyl group, $PO(OH)_2$, and $OPO(OH)_2$ and hydroxyl group; and "1" is a polymerization degree). Specifically, $R^2$ and $R^3$ are preferably methyl group, while $R^4$ and $R^5$ are preferably sulfone group or carboxyl group from the respect of ready introduction of an acid group into at least one of the two and the reactivity with a basic metal compound.

The weight average molecular weight (Mw) of the PPO to be used in accordance with the present invention is preferably 5,000 to 100,000, more preferably 10,000 to 80,000 because the heat resistance is insufficient because of the decrease of the glass transition point (Tg) if the weight is too less while the moldability is insufficient if the weight is too much.

Additionally, a vinyl monomer represented by the formula 3 or butadiene may be contained in the PS within a range of no occurrence of the deterioration of the advantages of the present invention.

Formula 3

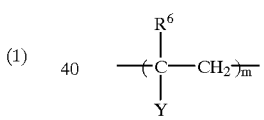
(3)

(wherein $R^6$ is hydrogen atom or methyl group; Y is tolyl group, ethylphenyl group, cyano group, chloromethyl- or bromomethylphenyl group, chloro- or bromophenyl group, carboxyl group or lower alkoxycarbonyl group; and "m" is a polymerization degree).

The content of the acid group in the thermally resistant resin composition (PS+PPO) is generally 0.1 to 50 molar %, preferably 1 to 35 molar %, because the effect of improving the heat resistance is not satisfactory if the content is too low while the water absorptivity of the thermally resistant resin composition is increased to cause insufficient water resistance if the content is too high. In PS and PPO blended resin composition, when the content of an acid group if introduced into either one of PS and PPO is 2.5 molar % or more, or when the content of acid groups if introduced into both PS and PPO is 4.0 molar % or more, the miscibility of both the resins is deteriorated. Good effects by the present invention are therefore obtained when acid groups with these contents or more are introduced.

The ratio of PS and PPO contents in the resin composition of the present invention may be appropriately determined depending on the purpose for use, the processing properties, the production cost and the like. Generally, the contents are as follows; the content of PS is 1 to 99% by weight, preferably 10% to 90% by weight, more preferably 20% to 80% by weight. Correspondingly, the content of PPO is generally 99% to 1% by weight, preferably 90 to 10% by weight, and more preferably 80% to 20% by weight. As has been described above, the content of PPO with a higher production cost can be remarkably lowered provided that the objective heat resistance is not changed compared with conventional heat resistance, whereby the production cost of the resin composition can be decreased profoundly.

In addition to PS and PPO, resins with excellent miscibility with these polymers may be added to the thermally resistant resin composition of the present invention, for example ABS resins, polyolefin resins (polyethylene, polypropylene, etc.), nylon (polycaprolactam) resins, acrylic resins (ethylene-acrylic acid, etc.) within a range of no occurrence of the deterioration of the advantages of the present invention, generally up to 20% by weight.

The thermally resistant resin composition of the present invention may be produced as follows. Firstly, PS and PPO each introduced with an acid group are independently prepared by a routine method, which are then mixed together and dissolved in a solvent such as tetrahydrofuran. To the resulting solution then was added an aqueous solution of a basic metal compound at an amount required to neutralize the acid groups present in the PS and PPO, prior to sufficient agitation to neutralize the acid groups to form ionic bonds. By removing the solvent from the solution, the thermally resistant resin composition is produced. Otherwise, a basic metal compound is added to the melt PS and PPO each with an acid group introduced, prior to kneading, to recover the thermally resistant resin composition.

Because the resulting thermally resistant resin composition is thermoplastic, the composition may be processed into housings of a variety of forms for electric appliances, by molding, press molding and the like. By utilizing the excellent heat resistance, additionally, the composition may be used as the materials for printed board.

The PS with ionic bonds formed by neutralizing the acid group of PS with a basic metal compound has got improved heat resistance compared with general PSs. The PPO with ionic bonds formed by neutralizing the acid group of PPO with a basic metal compound has got improved heat resistance compared with general PPOs. Therefore, the PS or PPO with such ion bonds formed may be used singly so as to improve the heat resistance of a molded article of conventional PS or PPO of a general type.

As has been described above, the basic metal compound for single use of PS or PPO with ionic bonds formed includes basic metal compounds containing a metal element of the group 2B, 3B, 4B or 5B. In such case, the acid group content in the PS is 0.1 to 50 molar %, preferably 2 to 20 molar %, while the acid group content in the PPO is 0.1 to 50 molar %, preferably 1 to 20 molar %.

Description has been made insofar about the improvement of the heat resistance of the thermally resistant resin composition of PS and PPO. The method for improving the heat resistance is also significant as a method for miscible preparation of PS with PPO, at least one of PS and PPO having been introduced with an acid group.

The present invention will be described in detail with reference to examples.

In the following Examples and Comparative Examples, a polystyrene of a molecular weight (Mw) of about 280,000 manufactured by Aldrich, Co. was used. Furthermore, a polyphenylene oxide (PPO) of a molecular weight (Mw) of about 35,000 was used.

EXAMPLE A1
Introduction of sulfonic acid group into PS

PS was dissolved in dichloroethane, and to the resulting solution was added a mixture solution of conc. sulfuric acid and acetic anhydride (1:1.2 in molar ratio) prior to agitation at 60° C. for reaction. After the completion of the reaction, the reaction mixture was poured into hot water, followed by washing and re-precipitation to dry the resulting precipitate, to recover PSs each with sulfonation degrees (contents of sulfone group in PS) of 4.0 molar %, 9.1 molar % and 20.0 molar %. Additionally, the sulfonation degree was controlled by the adjustment of the amounts of conc. sulfuric acid and acetic anhydride added.

EXAMPLE A2
Introduction of carboxyl group into PS

Radical polymerization of styrene monomer, 4-vinyl benzoic acid and a radical polymerization initiator (benzoyl peroxide; manufactured by Nippon Yushi, Co. Ltd. ) was done in tetrahydrofuran in nitrogen atmosphere at 50° c. After the termination of the polymerization, re-precipitation with a greater volume of methanol was carried out to recover precipitate, which was then dried to yield carboxylic acid-modified PS at a carboxylate content of 2.5 molar % or 5.2 molar %. Herein, the carboxylate content was controlled with the amount of 4-vinyl benzoic acid charged.

EXAMPLE A3
Introduction of sulfonic acid group into PPO

By the same procedures as those for the introduction of sulfonic acid group into PS, PPO with a sulfonation degree of 1.0 molar %, 2.7 molar %, 5.0 molar % or 7.1 molar % was recovered.

EXAMPLE A4
Introduction of carboxyl group into PPO

To a tetrahydrofuran solution of PPO was added dropwise a given amount of n-butyl lithium in a hexane solution under nitrogen purge for reaction at 25° C., and the resulting solution was poured into dry ice to terminate the reaction. Acidifying the resulting mixture with dilute hydrochloric acid and re-precipitating the mixture with a greater volume of hexane, the resulting precipitate was dried to recover carboxylic acid-modified PPO at a carboxylate content of 4.0 molar % or 5.0 molar %.

EXAMPLES A5 TO A17 AND COMPARATIVE EXAMPLES A1 TO A6

Polymer materials comprising PS or PPO or both, with the compositions shown in Tables 1 and 2, were dissolved in tetrahydrofuran, and to the resulting solutions was added an aqueous solution of a neutralization equivalent of a basic metal compound (zinc acetate in water sol., aluminium lactate in water sol., antimony trichloride in acetone solution, stannic chloride ($SnCl_4$) in water sol., to neutralize the acid group in PS or PPO or both.

After the neutralization, the solvent was removed from the solutions, followed by drying, to recover thermally resistant resin compositions of Examples A5 to A17 and Comparative Examples A1 to A6.

The resulting resin compositions of Examples A5 to A17 and Comparative Examples A1 to A6 were molded into a plate of a 0.3-mm thickness by means of a high-temperature press at 260° C. and 9.8 Mpa. The glass transition temperatures (Tg) thereof were determined by measuring the temperature elevation rate at 20° C. per minute by means of a differential scanning calorie analyzer (product name; DSC-7, manufactured by Perkin Elmer Co. Ltd.). Tables 1 and 2 show the results.

Tables 1 and 2 show additionally the glass transition points (Tgs) of blank PS with neither acid group nor ionic bonding (Comparative Example A1), PS with an ionic bond formed by using sodium hydroxide in place of a basic metal compound (Comparative Examples A2 and A3), blank PPO with neither acid group nor ionic bonding (Comparative Example A4), PPO with an ionic bond formed by using sodium hydroxide in place of a basic metal compound (Comparative Example A5), and a blend of blank PS and blank PPO (Comparative Example A6).

In Tables 1 and 2, "S" in the acid group column means "sulfonic acid group"; "C" means "carboxyl group".

The results of Examples A5 to A7 indicate that the glass transition point is elevated as the increase of the sulfonic acid group content from 4.0 molar % to 20.0 molar %. The results of Examples A7 and A8 indicate that zinc is superior to aluminium as the basic metal for the basic metal compounds in terms of the improvement of heat resistance.

TABLE 1

| | PS | | | PPO | | | |
|---|---|---|---|---|---|---|---|
| | Acid group | | Blended | Acid group | | Blended | |
| | Type | Content (molar %) | amount (wt %) | Type | Content (molar %) | amount (wt %) | Basic metal | Tg (° C.) |

| | Type | Content (molar %) | amount (wt %) | Type | Content (molar %) | amount (wt %) | Basic metal | Tg (° C.) |
|---|---|---|---|---|---|---|---|---|
| Comparative example | | | | | | | | |
| A1 | — | — | 100 | — | — | 0 | — | 103.5 |
| A2 | S | 4.0 | 100 | — | — | 0 | Na | 114.2 |
| A3 | S | 9.1 | 100 | — | — | 0 | Na | 122.0 |
| Example | | | | | | | | |
| A5 | S | 4.0 | 100 | — | — | 0 | Zn | 125.3 |
| A6 | S | 9.1 | 100 | — | — | 0 | Zn | 140.7 |
| A7 | S | 20.0 | 100 | — | — | 0 | Zn | 185.0 |
| A8 | S | 20.0 | 100 | — | — | 0 | Al | 181.5 |

TABLE 2

| | Type | Content (molar %) | amount (wt %) | Type | Content (molar %) | amount (wt %) | Basic metal | Tg (° C.) |
|---|---|---|---|---|---|---|---|---|
| Comparative example | | | | | | | | |
| A4 | — | — | — | — | — | 100 | — | 209.4 |
| A5 | — | — | — | S | 1.0 | 100 | Na | 210.3 |
| Example | | | | | | | | |
| A9 | — | — | — | S | 1.0 | 100 | Al | 218.4 |
| A10 | — | — | — | S | 2.7 | 100 | Al | 225.3 |
| A11 | — | — | — | S | 5.0 | 100 | Zn | 241.3 |
| A12 | — | — | — | C | 4.6 | 100 | Zn | 236.4 |
| Comparative example | | | | | | | | |
| A6 | — | — | 20 | — | — | 80 | — | 184.0 |
| Example | | | | | | | | |
| A13 | S | 4.0 | 20 | — | — | 80 | Al | 199.5 |
| A14 | — | — | 20 | S | 2.7 | 80 | Al | 200.8 |
| A15 | S | 4.0 | 20 | S | 2.7 | 80 | Zn | 212.7 |
| A16 | S | 4.0 | 20 | S | 2.7 | 80 | Sb | 208.5 |
| A17 | S | 4.0 | 20 | S | 2.7 | 80 | Sn | 207.0 |

Tables 1 and 2 indicate the following.

No ionic bond is formed in the PS of Comparative Example A1; an ionic bond is formed via an alkali metal hydroxide instead of any amphoteric metal compound in Comparative Examples A2 and A3. On the contrary, the PSs of Examples A5 to A8 with ionic bonds formed through the reaction of basic metal compounds containing metal elements of the group 2B or 3B of the periodic table have highly increased glass transition points compared with the PSs of Comparative Examples A1 to A3, which indicates that the heat resistance thereof is remarkably improved.

The results of Comparative Examples A4 and A5 and Examples A9 to A12 indicate that the heat resistance of PPO can be greatly improved by constituting the ion bond in PPO via amphoteric metals.

The results of Comparative Example A6 and Examples A13 to A17 indicate that the thermally resistant resin compositions comprising a mixture of PS and PPO can procure improved heat resistance if an ionic bond is formed in at least one of PS and PPO. Preferably, acid groups are introduced into both of PS and PPO, in particular, to form an ionic bond.

EXAMPLES B1 TO B13 AND COMPARATIVE EXAMPLES B1 TO B14

Polymer materials comprising PS or PPO or both, with the compositions shown in Tables 3 and 4, were dissolved in tetrahydrofuran, and to the resulting solutions was added an aqueous solution of a neutralization equivalent of a basic metal compound (aluminium lactate, stannous sulfate, zinc acetate, antimony trichloride (in acetone solution, manganese acetate, cobalt acetate), to neutralize the acid-group in PS or PPO or both.

After the neutralization, the solvent was removed from the solutions, followed by drying, to recover thermally resistant resin compositions of Examples B1 to B13 and Comparative Example B1 to B14.

The resulting resin compositions of Examples B1 to B13 and Comparative Examples B1 to B14 were molded into a plate of a 0.3-mm thickness by means of a high-temperature press at 260° C. and 9.8 Mpa. The glass transition temperatures (Tg) thereof were determined by measuring the temperature elevation rate at 20° C. per minute by means of a differential scanning calorie analyzer (product name; DSC-7, manufactured by Perkin Elmer Co. Ltd.). Tables 3 and 4 show the results.

Tables 3 and 4 show additionally the glass transition points (Tgs) of a blend of blank PS and blank PPO both with neither acid group nor ionic bonding (Comparative Example B1, B5, B10, and B12), a blend of PS and PPO both with an ionic bond formed by using sodium hydroxide in place of a basic metal compound (Comparative Examples B2, B6, B8, and B13), a blend of PS and PPO both with an ionic bond formed by using manganese acetate in place of a basic metal compound (Comparative Examples B3, B7 and B9), a blend of PS and PPO both with an ionic bond formed by using cobalt acetate in place of a basic metal compound (Comparative Examples B4 and B11).

In Tables 3 and 4, furthermore, "S" in the acid group column means "sulfonic acid group"; "C" means "carboxyl group".

TABLE 3

| | PS | | | PPO | | | | |
|---|---|---|---|---|---|---|---|---|
| | Acid group | | Blended | Acid group | | Blended | | |
| | Type | Content (molar %) | amount (wt %) | Type | Content (molar %) | amount (wt %) | Basic metal | Tg (° C.) |
| Comparative example | | | | | | | | |
| B1 | — | — | 60 | — | — | 40 | — | 142.1 |
| B2 | S | 4.0 | 60 | — | — | 40 | Na | 142.3  214.9 |
| B3 | S | 4.0 | 60 | — | — | 40 | Mn | 141.7  208.6 |
| B4 | C | 2.5 | 60 | — | — | 40 | Co | 133.2  196.0 |
| Example | | | | | | | | |
| B1 | S | 4.0 | 60 | — | — | 40 | Sn | 152.8 |
| B2 | S | 4.0 | 60 | — | — | 40 | Sb | 152.1 |
| Comparative example | | | | | | | | |
| B5 | — | — | 40 | — | — | 60 | — | 161.20 |
| B6 | S | 9.1 | 40 | — | — | 60 | Na | 149.6  214.9 |
| B7 | S | 9.1 | 40 | — | — | 60 | Mn | 148.3  207.8 |
| Example | | | | | | | | |
| B3 | S | 9.1 | 40 | — | — | 60 | Sn | 178.3 |
| B4 | S | 9.1 | 40 | C | 5.0 | 60 | Al | 183.2 |
| B5 | S | 9.1 | 40 | — | — | 60 | Sb | 175.1 |
| Comparative example | | | | | | | | |
| B8 | S | 9.1 | 40 | S | 2.7 | 60 | Na | 152.1  212.4 |
| Example | | | | | | | | |
| B6 | C | 2.5 | 40 | C | 5.0 | 60 | Pb | 184.2 |
| B7 | S | 9.1 | 40 | S | 2.7 | 60 | Sb | 180.2 |

TABLE 4

| | PS | | | PPO | | | |
|---|---|---|---|---|---|---|---|
| | Acid group | | Blended | Acid group | | Blended | |
| | Type | Content (molar %) | amount (wt %) | Type | Content (molar %) | amount (wt %) | Basic metal | Tg (° C.) |
| Comparative example | | | | | | | | |
| B9 | S | 20.0 | 60 | — | — | 40 | Mn | 180.1 215.0 |
| Example | | | | | | | | |
| B8 | S | 20.0 | 60 | — | — | 40 | Sn | 198.2 |
| B9 | S | 4.0 | 60 | — | — | 40 | Sn | 170.2 |
| B10 | S | 4.0 | 60 | — | — | 40 | Sb | 173.5 |
| Comparative example | | | | | | | | |
| B10 | — | — | 20 | — | — | 80 | — | 181.2 |
| B11 | S | 4.0 | 20 | — | — | 80 | Co | 189.7 213.5 |
| Example | | | | | | | | |
| B11 | S | 4.0 | 20 | — | — | 80 | Al | 218.1 |
| Comparative example | | | | | | | | |
| B12 | S | — | 80 | — | — | 20 | — | 121.8 |
| B13 | S | 4.0 | 80 | — | — | 20 | Na | 123.5 193.6 |
| Example | | | | | | | | |
| B12 | S | 4.0 | 80 | — | — | 20 | Pb | 145.1 |
| Comparative example | | | | | | | | |
| B14 | — | — | 60 | S | 7.1 | 40 | Na | 121.8 |
| Example | | | | | | | | |
| B13 | — | — | 60 | S | 7.1 | 40 | Sn | 162.1 |

Tables 3 and 4 indicate the following.

Those of Examples B1 to B13 produced by blending together PS and PPO at least one of which has an acid group, and neutralizing the acid group with a basic metal compound containing a metal element of the group 3B, 4B or 5B of the periodic table have individually a single glass transition point because of good miscibility, as is observed in those of Comparative Examples B1, B5, B10 and B12 produced by blending together PS and PPO with no acid group. Furthermore, the glass transition points thereof are elevated, which indicates the improvement of the heat resistance.

Alternatively, those of Comparative Examples B2 to B4, B6 to B9, B11 and B13 in which neutralization was performed with metal compounds containing not a metal element of the group 3B, 4B and 5B but Na, Mn or Co cannot acquire satisfactory miscibility, to consequently have individually two glass transition points. In such case, the heat resistance of the blends depends on the lower glass transition point.

For reference, the dynamic elastic moduli (tan δ) of the resin compositions of Examples B3, Comparative Examples B5 and B6 vs temperature were measured at a temperature elevation rate of 5° C./minute and at a frequency of 1 Hz with a viscoelasticity analyzer (SOLID ANALYZER RSRA2, manufactured by RHEOMETRIC CO.). The results are shown in FIG. 1. FIG. 1 indicates that the composition of Example B3 produced by blending PPO into PS with an acid group and neutralizing the acid group with stannous sulfate has a single glass transition point as is observed in the composition of Comparative Example B5 in which PS and PPO both with no acid group are blended together, which indicates that the miscibility thereof is excellent. Additionally, it is indicated that the glass transition point is elevated, involving the improvement of the heat resistance. The composition of Comparative Example B6 neutralized with sodium hydroxide has two glass transition points, which indicates insufficient miscibility.

What is claimed is:

1. A thermally resistant polyphenylene oxide compound having an acid group and being represented by the following formula (2), wherein the acid group is neutralized with a neutralization equivalent amount of a basic metal compound effective to neutralize the acid group, the basic metal compound containing a metal selected from the group consisting of Al, Ga, In, Tl, Ge, Sn, Pb and Bi;

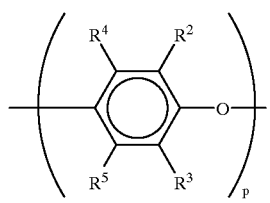

wherein $R^2$ and $R^3$ independently represent methyl group, or an acid group selected from the group consisting of carboxymethyl group, sulfonic methyl group, —$CH_2PO(OH)_2$, and —$CH_2OPO(OH)2$; $R^4$ and $R^5$ independently represent an acid group selected from the group consisting of sulfonic (acid) group, carboxyl group, $PH(OH)_2$, $OPO(OH)_2$ and hydroxyl group; and "p" is a polymerization degree, the polyphenylene oxide compound having a weight average molecular weight ranging from about 5,000 to about 100,000 and comprising from about 1 to about 15 mol % of the acid group.

2. A polyphenylene oxide compound according to claim 1, wherein the basic metal compound contains Al.

3. A polyphenylene oxide compound according to claim 1, wherein the basic metal compound contains Ge, Sn, Pb, or Bi.

4. A polyphenylene oxide compound according to claim 1, wherein the acid group is sulfonic (acid) group $OPO(OH)_2$, $PO(OH)_2$, carboxyl group or phenolic hydroxyl group.

* * * * *